United States Patent
Garnett et al.

(10) Patent No.: US 9,933,078 B2
(45) Date of Patent: Apr. 3, 2018

(54) PASSIVE EXPLOSION ISOLATION VALVE WITH PULSE JET CLEANING

(71) Applicant: Fike Corporation, Blue Springs, MO (US)

(72) Inventors: Ryan Garnett, Kansas, MO (US); E. Dean Miller, Lee's Summit, MO (US)

(73) Assignee: Fike Corporation, Blue Springs, MO (US)

( * ) Notice: Subject to any disclaimer, the term of this patent is extended or adjusted under 35 U.S.C. 154(b) by 331 days.

(21) Appl. No.: 14/633,818

(22) Filed: Feb. 27, 2015

(65) Prior Publication Data

US 2015/0247583 A1    Sep. 3, 2015

Related U.S. Application Data

(60) Provisional application No. 61/946,319, filed on Feb. 28, 2014.

(51) Int. Cl.
| | |
|---|---|
| *B01D 46/02* | (2006.01) |
| *B01D 46/48* | (2006.01) |
| *E21B 21/12* | (2006.01) |
| *E21B 37/04* | (2006.01) |
| *F16K 15/03* | (2006.01) |
| *F16K 51/00* | (2006.01) |
| *B08B 5/02* | (2006.01) |

(Continued)

(52) U.S. Cl.
CPC ............. *F16K 15/03* (2013.01); *B08B 5/02* (2013.01); *F16K 25/02* (2013.01); *F16K 51/00* (2013.01); *B01D 46/0093* (2013.01); *Y10T 137/0419* (2015.04); *Y10T 137/4259* (2015.04); *Y10T 137/7903* (2015.04)

(58) Field of Classification Search
CPC .... B01D 46/02; B01D 46/48; B01D 46/0067; B01D 46/0068; B01D 46/0087; B01D 46/2407; B01D 50/002; E21B 21/12; E21B 37/04; E21B 2034/005
USPC ......... 55/282, 283, 302, 284, 310, 311, 431; 95/278, 279, 280; 166/311, 320, 332.8, 166/222
See application file for complete search history.

(56) References Cited

U.S. PATENT DOCUMENTS

| | | | |
|---|---|---|---|
| 4,434,564 A | * | 3/1984 | Braggins, Jr. ........... D06F 58/20 34/235 |
| 4,810,270 A | * | 3/1989 | Terry .................. B01D 46/0046 209/274 |

(Continued)

FOREIGN PATENT DOCUMENTS

DE    3509352    9/1986

OTHER PUBLICATIONS

The Extended European Search Report dated Oct. 18, 2017, in application No. 15754475.0.

(Continued)

*Primary Examiner* — Frank Lawrence, Jr.
*Assistant Examiner* — Minh-Chau Pham
(74) *Attorney, Agent, or Firm* — Hovey Williams LLP (57) ABSTRACT

A passive isolation valve equipped with one or more nozzles configured to deliver a flow of gas to an area adjacent the valve seat so as to remove accumulated particulate material from the area of the valve adjacent the valve seat that otherwise may adversely affect closure of the valve in response to an energetic event.

24 Claims, 7 Drawing Sheets

(51) Int. Cl.
*F16K 25/02* (2006.01)
*B01D 46/00* (2006.01)

(56) References Cited

U.S. PATENT DOCUMENTS

| | | | | |
|---|---|---|---|---|
| 5,143,529 | A | * | 9/1992 | Means, Jr. ............... B08B 5/02 134/22.12 |
| 5,565,012 | A | * | 10/1996 | Buodd ............... B01D 46/0068 15/352 |
| 5,584,900 | A | * | 12/1996 | Zaiser .................... B01D 41/04 55/293 |
| 5,676,170 | A | | 10/1997 | Andonov et al. |
| 5,788,746 | A | * | 8/1998 | Bartling ............ B01D 46/0067 55/282 |
| 5,827,338 | A | * | 10/1998 | Horvat ............... B01D 46/0024 55/285 |
| 6,131,594 | A | | 10/2000 | Staggs et al. |
| 8,157,878 | B2 | * | 4/2012 | Weber ............... B01D 46/0068 55/302 |
| 2005/0056429 | A1 | | 3/2005 | Du et al. |
| 2005/0115212 | A1 | * | 6/2005 | David .................. A47L 9/1666 55/337 |
| 2005/0210842 | A1 | * | 9/2005 | McCausland ...... B01D 46/0068 55/302 |
| 2005/0263732 | A1 | * | 12/2005 | Kurian ................ F16K 27/0272 251/298 |
| 2006/0254228 | A1 | * | 11/2006 | Moktader ............. B01D 53/24 55/418 |
| 2009/0107329 | A1 | * | 4/2009 | Lee ........................ B01D 46/02 95/22 |
| 2010/0230109 | A1 | | 9/2010 | Lake et al. |
| 2013/0074461 | A1 | * | 3/2013 | Sisk ................... B01D 46/0046 55/476 |
| 2013/0133893 | A1 | * | 5/2013 | Anderson ............. E21B 21/12 166/311 |
| 2013/0234054 | A1 | | 9/2013 | Eijkelenberg et al. |

OTHER PUBLICATIONS

The International Search Report and Written Opinion dated Jun. 15, 2015, in PCT/US15/017995 filed Feb. 27, 2015.

* cited by examiner

PASSIVE EXPLOSION ISOLATION VALVE WITH PULSE JET CLEANING

RELATED APPLICATION

The present application claims the benefit of U.S. Provisional Patent Application No. 61/946,319, filed Feb. 28, 2014, which is incorporated by reference herein in its entirety.

BACKGROUND OF THE INVENTION

Field of the Invention

The present invention is generally directed toward a passive explosion isolation valve having a self-cleaning feature configured to prevent build up of debris that may adversely impact closure of the valve in the event of an energetic event.

Description of the Prior Art

Various industrial plants employ dust collection systems for removing fine particulate matter from material processing equipment in order to avoid discharge of the particulate matter into the environment. Such dust collection systems often comprise a baghouse or similar dust collection apparatus in which the particulate matter is collected prior to venting of the air stream to the atmosphere. The particulate matter collected may be highly flammable or explosive. Isolation valves are often employed to protect upstream equipment from the disastrous consequences of an explosion within the dust collection apparatus.

Isolation valves can be of the active or passive type. Active isolation valves generally require some kind of mechanical actuation in response to a detected hazardous condition, such as a deflagration wave or flame front. Active isolation valves may be of the gate valve-type, such as disclosed in U.S. Pat. No. 6,131,594, in which shifting of a gate member is effected through actuator apparatus. Another type of active isolation valve is a pinch valve, such as disclosed in U.S. Patent Application Publication No. 2013/0234054, in which an inner sleeve is compressed. As with a gate-type isolation valve, closure of the pinch valve sleeve is effected through an actuator device. Active isolation valves, while effective, are generally more complex and require the installation of detection equipment capable of identifying the onset of a hazardous energetic event and triggering the valve-closing actuator, thus resulting in increased capital cost.

Passive isolation valves, such as check valves, are generally much less complex and do not rely upon detection devices for their actuation. Rather, passive isolation valves are generally responsive to environmental changes, such as the energetic event itself or changes in pressure or direction of fluid flow. As such, passive isolation valves generally are not actively monitored to ensure their operational readiness, apart from routine inspection and maintenance. In dust collection systems, it has been discovered that accumulation of particulate matter in the vicinity of the valve may adversely impact the valve's effectiveness in preventing propagation of an energetic event. Particularly, accumulation of dust or other matter may interfere with full closure of the valve's gate member.

The present invention seeks to overcome these problems by providing a passive isolation valve configured to prevent build up of particulate matter in the vicinity of the valve closure member that could adversely affect the valve's performance in response to an energetic event.

SUMMARY OF THE INVENTION

According to one embodiment of the present invention there is provided a passive isolation valve. The valve comprises a valve body having a valve inlet, a valve outlet, and a passage through the valve body interconnecting the inlet and outlet. A gate member is secured to the valve body by a hinge that permits shifting of the gate member between a valve open position, in which the valve inlet is in communication with the valve outlet, and a valve closed position, in which the gate member blocks communication between the valve inlet and the valve outlet. The valve body further comprises a valve seat that the gate member contacts during shifting from the open position to the closed position in response to an energetic event downstream from the valve. The valve further comprises one or more nozzles installed within the valve body and configured to introduce a flow of gas into the passage adjacent the valve seat and to remove accumulated material from the vicinity of the valve seat that may interfere with the contacting of the gate member with the valve seat during shifting of the gate member from the open position to the closed position.

According to another embodiment of the present invention there is provided a passive isolation valve. The valve comprises a valve body having a valve inlet, a valve outlet, and a passage through the valve body interconnecting the valve inlet and valve outlet. The valve further comprises a gate member secured to the valve body by a hinge that permits shifting of the gate member between a valve open position, in which the valve inlet is in communication with the valve outlet, and a valve closed position, in which the gate member blocks communication between the valve inlet and said valve outlet. The valve body further comprises a valve seat that the gate member contacts during shifting from the open position to the closed position in response to an energetic event downstream from the valve. The gate member comprises a bulged central section having opposed convex and concave surfaces and a circumscribing sidewall extending transversely from the concave surface, and a circumscribing rim extending transversely from the sidewall and outboard of said central section. The sidewall and the rim cooperate with the valve seat to block communication between the valve inlet and the valve outlet when the gate member is in the valve closed position.

In yet another embodiment of the present invention there is provided a method of cleaning a passive isolation valve installed within a pneumatic material handling system. The method comprises providing a passive isolation valve according to any embodiment of the present invention. The one or more nozzles of the valve are connected to a source of pressurized gas. A gaseous stream including suspended particulate material is conducted through the valve passage and around the gate member. A flow of pressurized gas is supplied to the one or more nozzles so as to cause the pressurized gas to be ejected from the one or more nozzles and into the valve passage adjacent the valve seat. The flow of pressurized gas causes particulate material that has settled from the gaseous stream in an area adjacent the valve seat to become re-suspended within the gaseous stream and removed from the area adjacent the valve seat.

DETAILED DESCRIPTION OF THE PREFERRED EMBODIMENT

Figure 1:
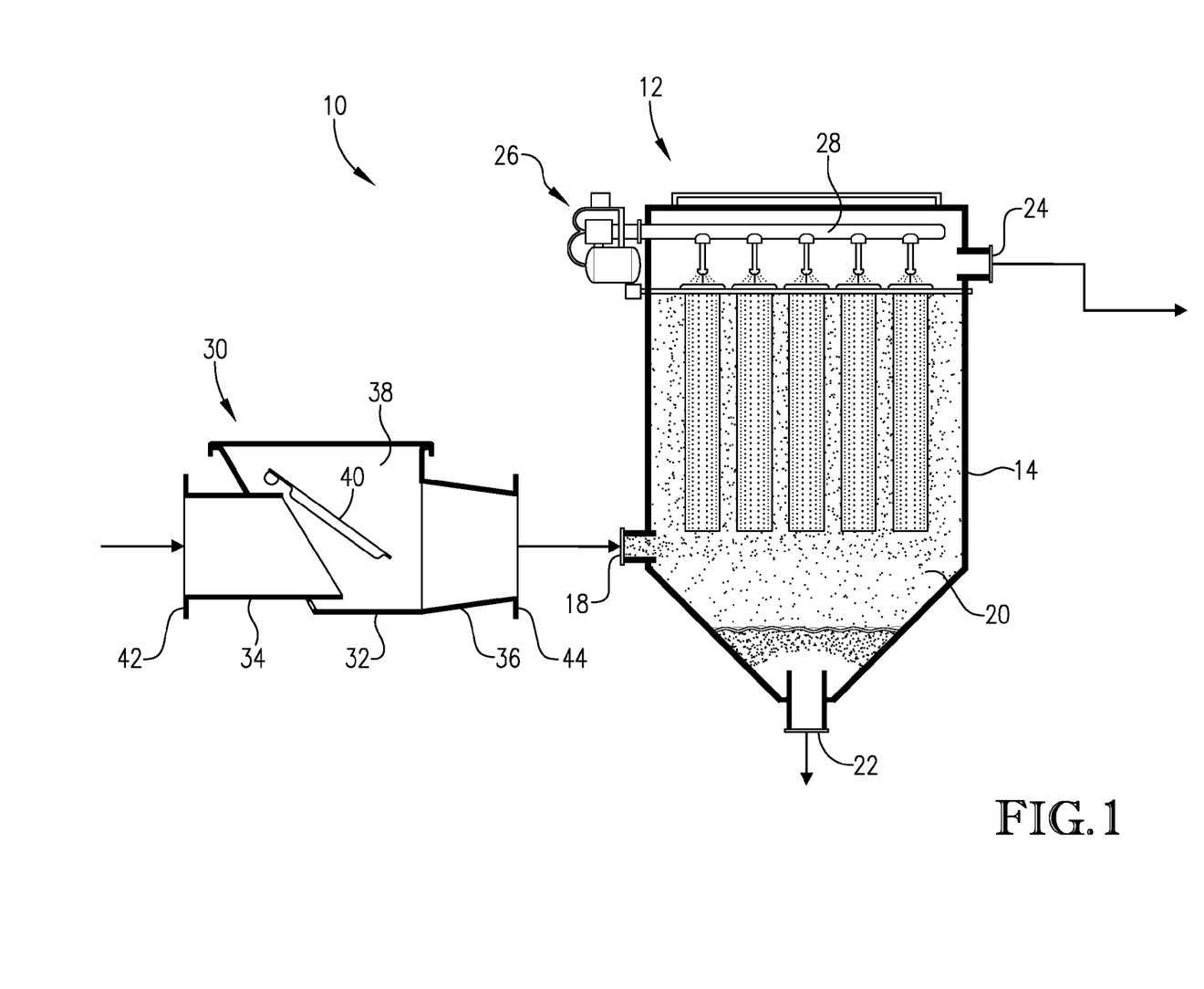
FIG. 1 is a schematic view of a passive isolation valve and baghouse as part of a dust collection system in accordance with one embodiment of the present invention.

The present invention relates generally to passive isolation valves for use in pneumatic material handling systems, and in particular dust collection systems. FIG. 1 shows a dust collection system 10 comprising dust collection apparatus 12. During normal operating conditions, excess dust or particulate matter suspended in a gas stream (e.g., an air stream) conveyed from an industrial plant or process (not shown) is directed to collection system 10. Collection apparatus 12 is configured to remove at least a portion, and preferably most, of the suspended to prevent the particulate matter from being exhausted to the atmosphere. As depicted in FIG. 1, dust collection apparatus 12 is a baghouse 14 comprising a plurality of bag filters 16 suspended therein. However, it is noted that collection apparatus 12 may comprise other equipment commonly used in dust collection or dry material handling systems, such as a cyclone, that comprise an impeller or fan operable to supply the motive force for directing the gas stream through the collection system. Collection apparatus 12 comprises an inlet 18 in which the gas stream including suspended particulate material enters apparatus 12. The gas stream flows through the plurality of bag filters 16 that separate the suspended particulate matter, which remains within an inner chamber 20, where it is collected until removed via a particulate outlet 22. Air that has passed through bag filters 16 and has had a substantial portion of suspended solid particulate material removed therefrom is then removed from baghouse 14 via a clean air outlet 24. In certain embodiments, collection apparatus 12 is equipped with a bag cleaning system 26 comprising a pressurized gas delivery system 28 that is capable of delivering a high pressure blast of air through delivery system to bag filters 16 that "shakes" the filters so as to dislodge accumulated particulate material therefrom and to cause such particulate material to collect within inner chamber 20.

Figure 2:
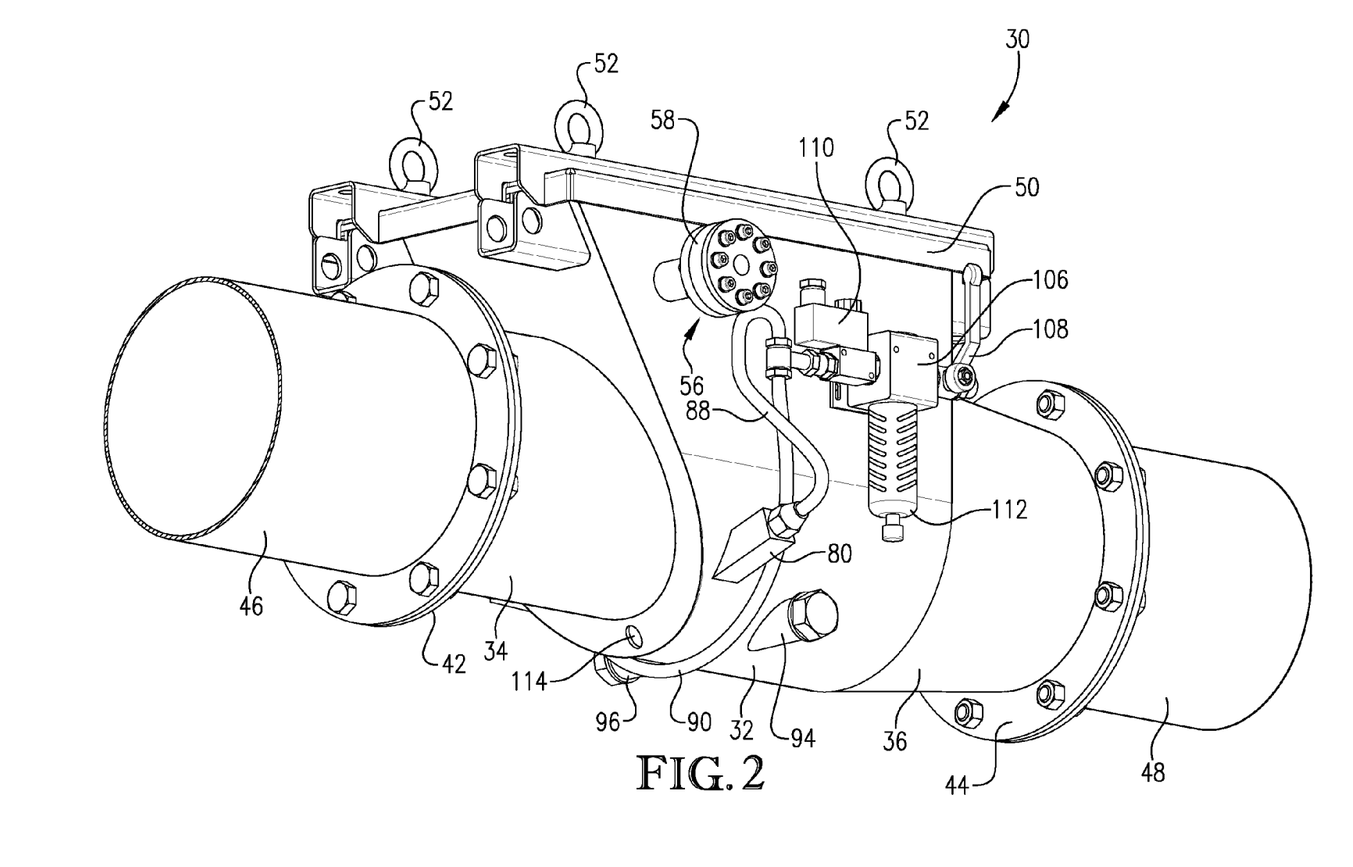
FIG. 2 is a perspective view of one embodiment of a passive isolation valve in accordance with the present invention.
Figure 3:
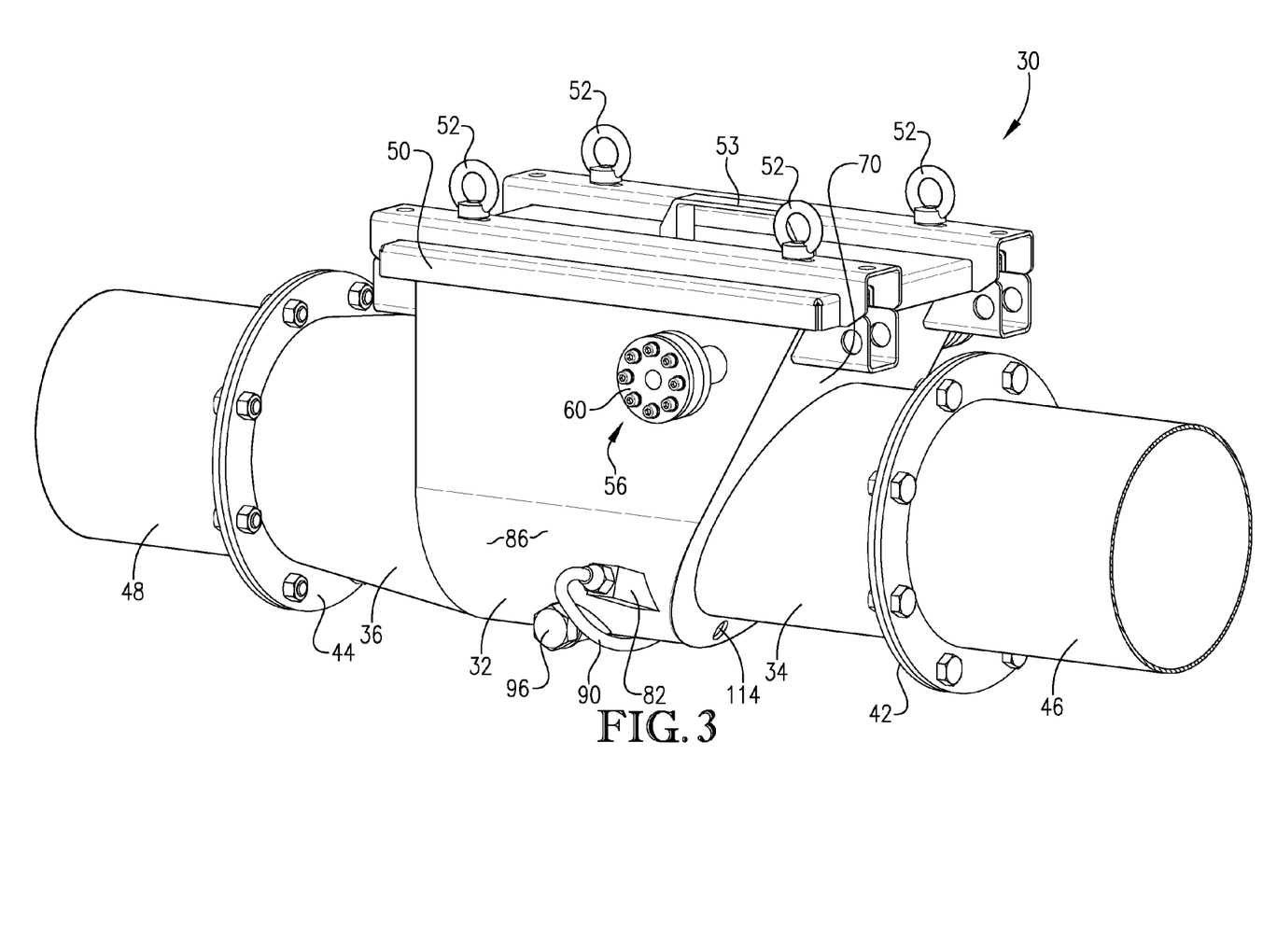
FIG. 3 is another perspective view of the embodiment of FIG. 2.

Dust collection system 10 also comprises or is operably connected to a passive isolation valve 30 that is in fluid communication with dust collection apparatus 12. Valve 30 comprises a valve body 32 that is disposed between a valve inlet section 34 and a valve outlet section 36. Valve body 32 defines at least in part an inner valve chamber 38 inside of which is located a hinged gate member 40. In certain embodiments, valve inlet section 34 and valve outlet section 36 comprise respective flanges 42, 44 that permit valve 30 to be secured to process piping or ductwork sections 46, 48 (see, e.g., FIG. 2). In certain embodiments, valve 30 may also include a removable panel 50 that permits access to inner valve chamber 38. In addition, panel 50 may be equipped with connective structure 52, such as eyehooks, to facilitate transport and installation of valve 30 in between ductwork sections 46, 48, and a handle 53 to permit lifting of panel 50 off of valve body 32.

Figure 4:
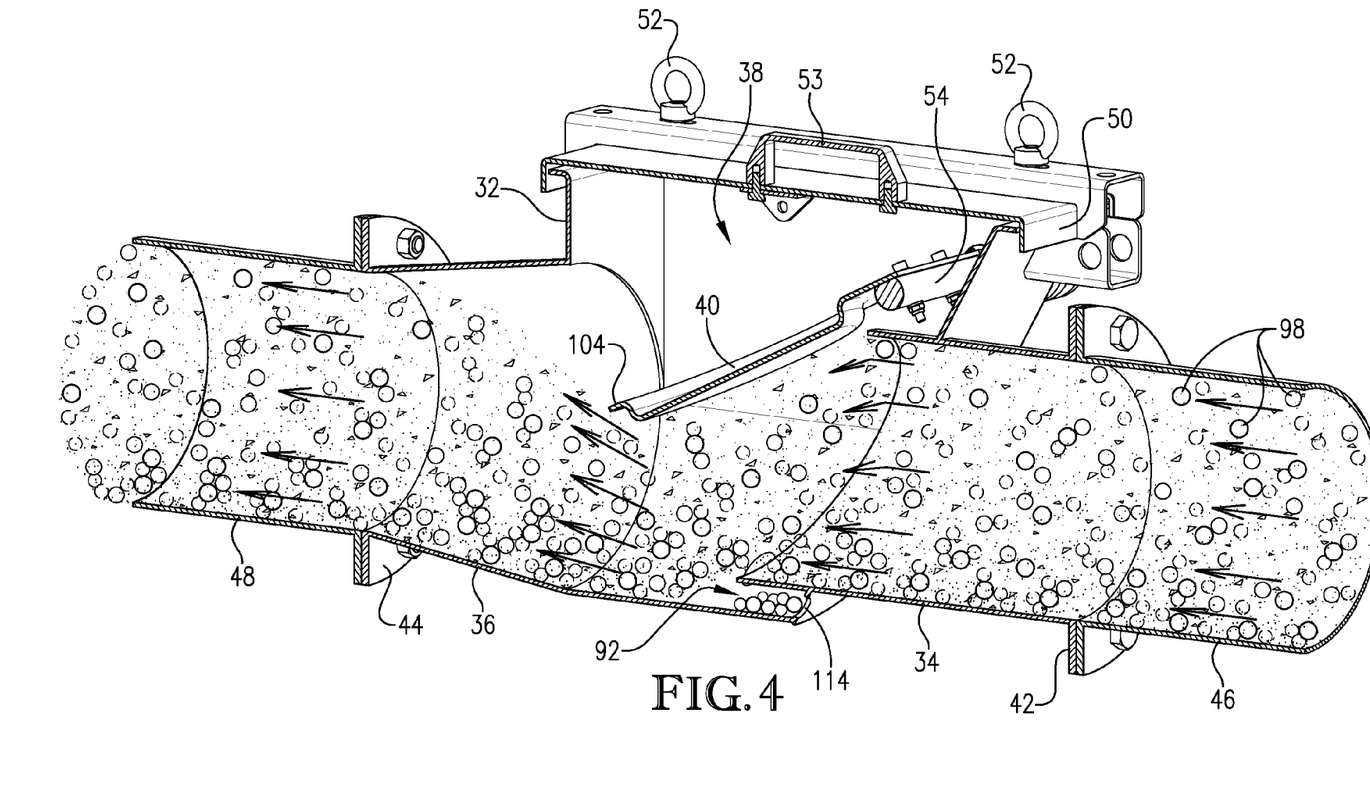
FIG. 4 is a cross-section view of the embodiment of FIG. 2 depicting particulate matter flowing through the passive isolation valve in its valve-open configuration.
Figure 5:
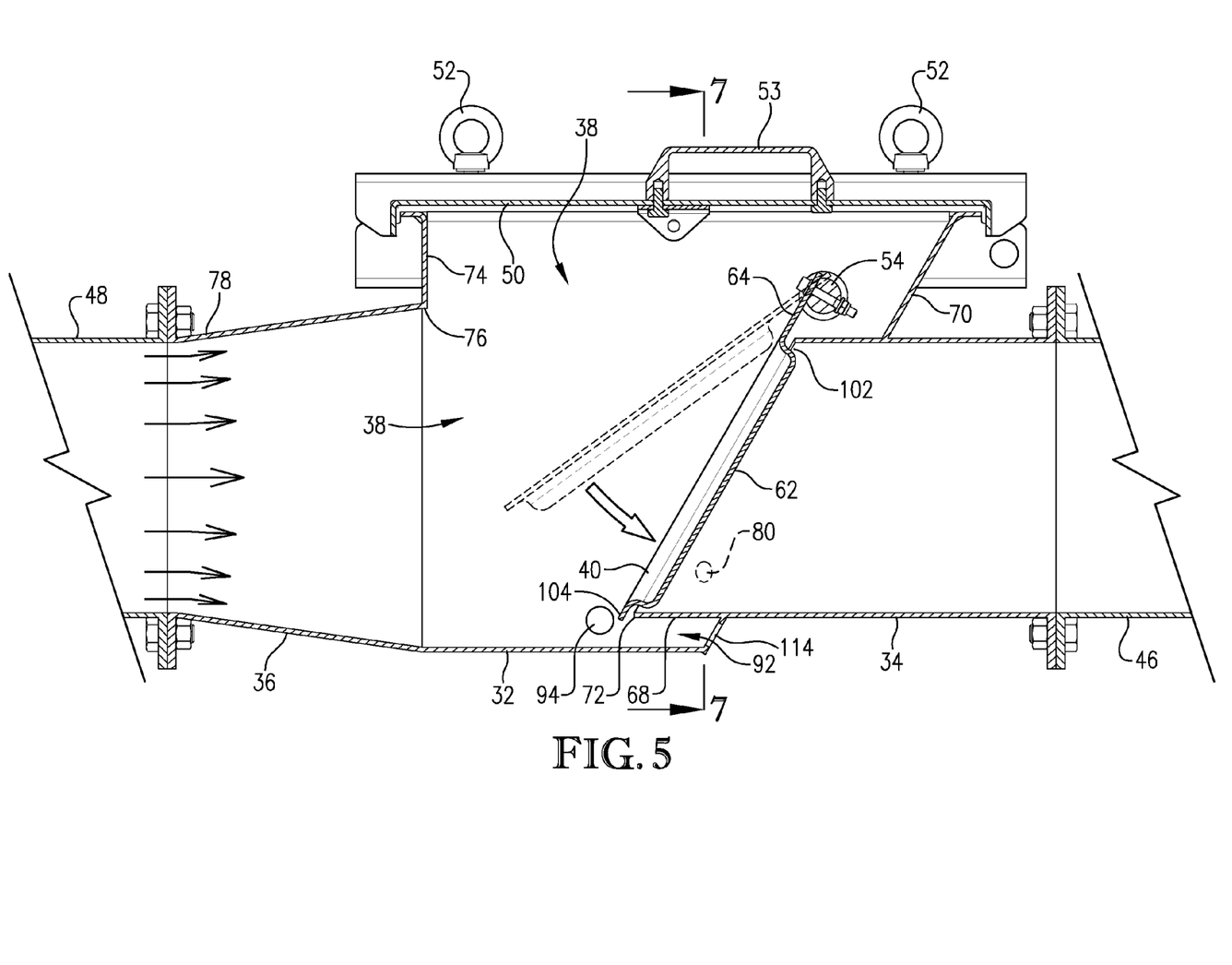
FIG. 5 is a cross-section view of a passive isolation valve during an energetic event effecting closure of the valve.
Figure 6:
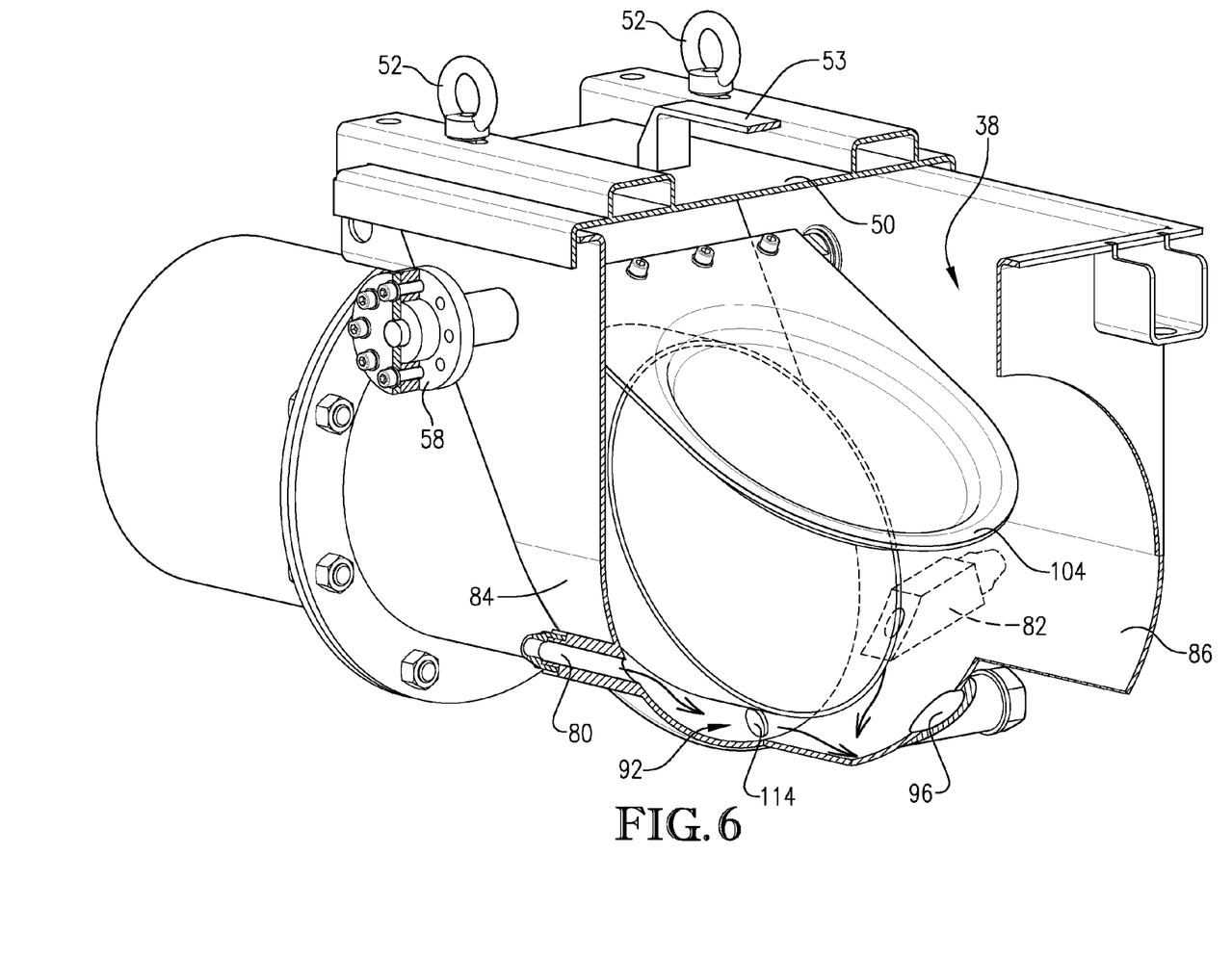
FIG. 6 is a partially sectioned view of a passive isolation valve illustrating operation of nozzles to remove accumulated matter from the valve in accordance with one embodiment of the present invention.

Turning now to FIGS. 4-6, gate member 40 shown being secured to a rotatable rod 54, which functions as a hinge for member 40, that is secured to a mechanism 56 that is operable to prevent opening of the gate member once it has been closed due to a downstream energetic event. In certain embodiments, mechanism 56 comprises a damping mechanism operable to dampen rotation of rod 54, and accordingly the shifting of gate member 40 as described hereunder. In certain embodiments, damping mechanism 56 comprises damping members 58, 60, which comprise a biasing means (not shown) such as a hydraulic element that inhibits, but not necessarily prevents, rotation of rod 54. In other embodiments, mechanism 56 may comprise a latching mechanism that physically locks or restricts further movement of gate member 40 after an downstream energetic event.

In certain embodiments, gate member 40 comprises a dished plate having a central section 62 that protrudes from a substantially planar, surrounding flange region or rim 64. In particular embodiments, central section 62 is of a bulged, concavo-convex configuration having opposed convex and concave surfaces. In certain embodiments, the surface of central section 62 facing toward valve inlet section 34 may be convex, while the surface of central section 62 facing toward valve outlet section 36 may be concave. Extending transversely from central section 62 and interconnecting flange region 64 is a circumscribing sidewall or transition region 66.

Valve inlet section 34 comprises an end segment 68 that extends through an oblique wall section 70 of valve body 32 (relative to the longitudinal axis of valve 30, which is also generally parallel to the direction of gas flow through the valve) and into inner chamber 38. End segment 68 comprises an oblique end margin 72, which in certain embodiments, lies in a plane that is parallel to wall section 70. As explained further below, end margin 72 and/or end segment 68 forms a seat for gate member 40 during shifting of gate member 40 between a valve open and valve closed position in response to an energetic event. Valve outlet section 36 is secured to a valve body sidewall section 74 located opposite from oblique wall section 70. In certain embodiments, outlet section 36 is of frustoconical shape having a larger diameter at its intersection 76 with sidewall section 74 than at its distal end 78. This is in contrast with valve inlet section 34, which is cylindrical and of relatively constant diameter from one end to the other.

Isolation valve 30 further comprises one or more nozzles 80, 82 that extend through the valve body 32 and communicate with the inner chamber 38. In certain embodiments, the nozzles are oriented obliquely with respect to the respective valve body sidewall 84, 86 through which they extend. In particular embodiments, nozzles 80, 82 are disposed at approximately a 45-degree angle relative to the respective sidewall 84, 86. In certain embodiments, nozzles 80, 82 communicate with inner chamber 38 via ports in sidewalls 84, 86 that are positioned below the longitudinal axis of valve 30 and between oblique wall section 70 and end margin 72. Each of nozzles 80, 82 are operably connected with a source of pressurized gas via gas lines 88, 90, respectively, and configured to introduce a flow of pressurized gas into inner chamber 38 as discussed below. In particular, nozzles 80, 82 are positioned so as to deliver a flow of pressurized gas into a "dead space" 92 within inner chamber 38. Dead space 92 is characterized as a region within inner chamber 38 exhibiting reduced velocity of gas being flowed through valve 30 such that particulate materials being carried by the valve throughput are no longer capable of remaining in suspension. Thus, particulate material entering dead space 92 is at risk of dropping out of suspension within the gas being passed through valve 30 and accumulating in the dead space 92 in the vicinity of inlet end segment 68 and end margin 72 as illustrated in FIG. 4. Generally, dead space 92 is defined as the annular channel of inner chamber 38 that is between oblique wall section 70 and end margin 72 and below the longitudinal axis of valve 30. In particular, dead space 92 may be further defined as being below the ports in sidewalls 84, 86 through which nozzles 80, 82 communicate with inner chamber 38.

In certain embodiments, valve 30 may be equipped with one or more sensors (not shown), such as optical sensors, attached via sensor ports 94, 96 formed in valve body 32. Ports 94, 96 are positioned so as to be capable of detecting the accumulation of particulate material within dead space 92. In particular embodiments, ports 94, 96 are disposed below the ports in sidewalls 84, 86 through which nozzles 80, 82 communicate with inner chamber 38.

As illustrated in FIG. 4, in certain embodiments when valve 30 is connected to a particulate collection system 10, particulate matter 98 suspended in a gaseous stream (illustrated by the arrows) comprising, for example, air, enters isolation valve 30 via valve inlet section 34 and flows through valve body 32 past gate member 40, and exits via valve outlet section 36. Upon exiting outlet section 36, the gaseous stream comprising particulate matter 98 may then be directed to collection apparatus 12. Gate member 40, in its valve open configuration illustrated in FIG. 4, disposed at an angle of approximately 70 degrees relative to a line normal to the longitudinal axis of the valve, partially obstructs the passage between valve inlet section 34 and valve outlet section 36 causing the air stream to deflect in a generally downward manner. As a result of this deflection, a portion of the gaseous stream is directed toward dead space 92 thereby causing a portion of the suspended particulate matter 98 to drop out and become deposited within or immediately adjacent to dead space 92. As explained below, the accumulation of particulate matter 98 could become great enough so as to interfere with closing of gate member 40 in response to an energetic event downstream of isolation valve 30.

As depicted in FIG. 5, during an energetic event occurring downstream of valve 30, such as an explosion in dust collection system 10, rapidly expanding gas begins to flow upstream through ductwork 38 as illustrated by the arrows. This upstream flow of gas exerts a force on gate member 40 thereby causing gate member to shift to a valve closed configuration in which gate member 40 is seated upon inlet end segment 68 in covering relationship to the outlet 100 of inlet section 34. Thus, the propagation of the energetic event upstream of valve 30 is arrested.

In certain embodiments of the present invention, in the valve closed configuration, gate member 40 is disposed at an angle of approximately 30 degrees relative to a line normal to the longitudinal axis of the valve. Thus, during closing of the valve, gate member 40 travels through a path of approximately 40 degrees. In the valve closed configuration, gate central section 62 resides inboard of inlet end segment 68 and upstream of end margin 72, and at least a portion of transition region 66 may come into contact with the inner surface 102 of end segment 68. In addition, at least a portion of flange 64 may come into contact with end margin 72. The seating of gate member 40 in this manner effectively blocks communication of inner chamber 38 with valve inlet section 34 thereby preventing upstream propagation of the energetic event. Once seated, damping mechanism 56 arrests further movement of gate member 40, especially movement of the gate member toward the valve open configuration. Thus, damping mechanism 56 prevents the premature re-opening of gate member 40 following an energetic event.

During closing of valve 30, the lower portion 104 of gate member 40 swings through a path of travel and traverses that may approach or enter dead space 92. Particulate matter 98 that has accumulated within dead space 92 (as shown in FIG. 4) may contact lower portion 104 and possibly become interposed between transition region 66 and inner surface 102 and/or flange 64 and end margin 72 thereby preventing gate member 40 from properly seating and failing to effectively block communication of inner chamber 38 with valve inlet section 34 and prevent the upstream propagation of the energetic event. Valve 30 is equipped with means for removing such accumulated particulate matter 98 from the path of travel of lower portion 104 of gate member 40. In particular, such means include one or more nozzles 80, 82 that are configured to deliver a burst of pressurized gas into a portion of the annular channel between inlet end segment 68 and valve body 32.

Figure 7:
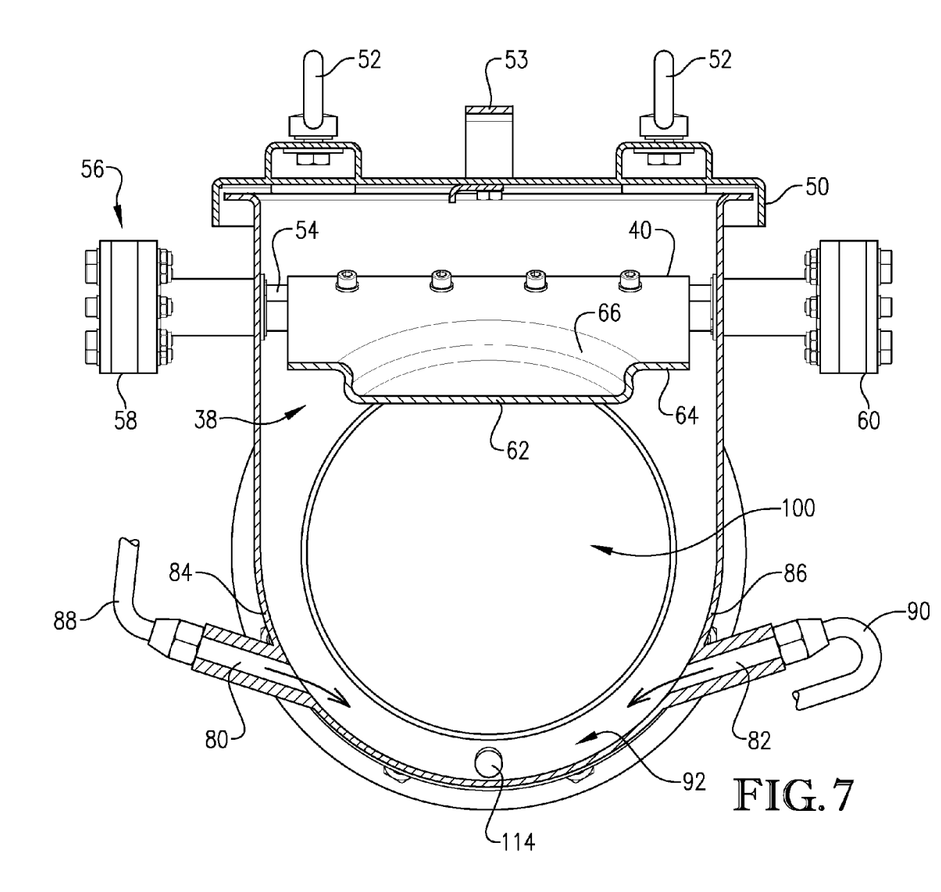
FIG. 7 is a cross-section view of the valve taken along line 7-7 of FIG. 5.

Turning to FIGS. 6 and 7, nozzles 80, 82 are installed in valve body 32 and configured to introduce a flow of gas into the annular channel of inner chamber 38 that is between oblique wall section 70, end margin 72 and inlet end segment 68, and especially dead space 92 in order to re-suspend accumulated particulate matter into the gas stream flowing through valve 30. It has been discovered that introducing the flow of gas from above and directing the flow downward upon the accumulated material is particularly effective in re-suspending the particulate matter into the gaseous stream flowing through valve 30. Therefore, nozzles 80, 82 are angled downwardly toward the bottom of inner chamber 38 so that the flow of gas introduced via nozzles 80, 82 is directed into dead space 92. In certain embodiments, the flow of gas from nozzles 80, 82 may be controlled by a controller assembly 106 (see, FIG. 2) that is operably connected to a source of pressurized gas (not shown). Controller assembly 106 may comprise a manual shutoff valve 108 to which a feed line may be connected, one or more solenoid valves 110 for metering the flow of gas to nozzles 80, 82, and a gas purge 112 for purging gas and condensation from the controller assembly. In alternate embodiments, nozzles 80, 82 and gas lines 88, 90 are operably connected to bag cleaning system 26 and operate under the control of system 26. In some embodiments, the flow of gas delivered from nozzles 80, 82 is introduced as a constant stream. However, in other embodiments, the flow of gas delivered from nozzles 80, 82 into inner chamber 38 is in the form of a pulsed stream of compressed air. In such embodiments, the duration of each pulse or burst of air is preferably between about 200 milliseconds to about 1.5 seconds, more preferably between about 500 milliseconds to about 1.3 seconds, and even more preferably between about 750 milliseconds to about 1.2 seconds, with the flow of gas being interrupted between consecutive pulses. The time between consecutive pulses can be varied depending upon a particular application for valve 30.

In certain embodiments, the pulse of gas is supplied simultaneously with the blast of gas supplied by bag cleaning system 26 that is used to dislodge particulate material from bag filters 16. In particular embodiments, this pulse is controlled by a baghouse controller and supplied at regular, repeating intervals. In other embodiments, the pulse of gas from nozzles 80, 82 is delivered only when an unacceptable accumulation of particulate matter 98 is detected inside inner chamber 38. As previously discussed, sensors can be installed within sensor ports 94, 96 to detect accumulation of particulate matter in the path of travel of lower portion 104 of gate member 40 or in the vicinity of end margin 72. In one embodiment, the sensors (not shown) comprise optical sensors. For example, a light-emitting sensor may be installed within port 94 that is operable to transmit a beam of light that is received by a receiving sensor installed within port 96. If the beam becomes interrupted by the accumulation of sufficient particulate material within dead space 92, gas control assembly 106 can be commanded to deliver a pulse of gas or a constant stream of gas, as the case may be, to nozzles 80, 82.

When the flow of gas is initiated, the gas flows from nozzles 80, 82 and is directed in a generally downward direction in in the annular channel between oblique wall section 70, end margin 72, and inlet end segment 68. In particular, the flow of gas is then directed into dead space 92 in the vicinity of any accumulated particulate matter 98. The flow of gas displaces at least a portion of any accumulated particulate matter residing in dead space 92 into the gaseous stream flowing through valve 30 thereby re-suspending the particulate matter within the gaseous stream, which conducts the particulate matter through valve outlet section. It will be appreciated that other nozzle configurations are possible without departing from the spirit of the present invention. For instance, valve 30 may comprise a single nozzle 80, or two, three or more nozzles spaced about the annular channel between oblique wall section 70, end margin 72, and inlet end segment 68. For example, a nozzle may be placed at the bottom dead-center region of dead space 92, which is indicated in the Figures by port 114. However, in certain embodiments, it is not desirable for a nozzle positioned at port 114 to be the only nozzle used. If no nozzle is installed within port 114, other sensing devices for detecting the presence of accumulated particulate matter in dead space 92 may be placed through the port, or the port simply may be plugged.

It is understood that the foregoing description of certain embodiments according to the present invention is intended to be illustrative and should not be taken as limiting the scope of the present invention in any way.

We claim:

1. A passive isolation valve comprising:
a valve body comprising a valve inlet, a valve outlet, and a passage through said valve body interconnecting said valve inlet and valve outlet; and
a gate member secured to said valve body by a hinge that permits shifting of said gate member between a valve open position, in which the valve inlet is in communication with said valve outlet, and a valve closed position, in which said gate member blocks communication between said valve inlet and said valve outlet,
said valve body further comprising a valve seat that said gate member contacts during shifting from said open position to said closed position in response to an energetic event downstream from said valve, said gate member, when in said valve open position, extends away from said valve seat in downstream direction, said valve body further comprising an annular channel located upstream from said valve seat,
said valve further comprising one or more nozzles installed within said valve body, said one or more nozzles being oriented obliquely to said annular channel and configured to introduce a downward flow of gas into said annular channel and adjacent to said valve seat to remove accumulated particulate material from the vicinity of said valve seat that would contact said gate member during shifting of said gate member from said open position to said closed position and become interposed between said gate member and said valve seat and re-suspend said particulate material into a gaseous stream flowing between said valve inlet and said valve outlet.

2. The valve according to claim 1, wherein said valve seat comprises an edge of a tubular member that extends into said passage, said edge residing in a plane that is oblique to said passage through said valve body.

3. The valve according to claim 2, wherein said one or more nozzles are installed within said valve body upstream of said edge and are operable to introduce a flow of gas into said passage upstream of said edge.

4. The valve according to claim 2, wherein said edge and said valve body cooperate to define said annular channel.

5. The valve according to claim 1, wherein said one or more nozzles are operable to deliver a pulsed flow of gas into said passage adjacent said valve seat.

6. The valve according to claim 5, wherein the duration of each of said pulses is between about 200 msec. to about 1.5 sec.

7. The valve according to claim 1, wherein said valve further comprises a mechanism secured to said gate member operable to restrict movement of said gate member from said closed position.

8. The valve according to claim 1, wherein said gate member comprises a bulged central section having opposed convex and concave surfaces and a circumscribing sidewall extending transversely from the concave surface, and a circumscribing rim extending transversely from said sidewall and outboard of said central section, said sidewall and said rim cooperating with said valve seat to block communication between said valve inlet and said valve outlet when said gate member is in said valve closed position.

9. A passive isolation valve comprising:
a valve body comprising a valve inlet, a valve outlet, and a passage through said valve body interconnecting said valve inlet and valve outlet; and
a gate member secured to said valve body by a hinge that permits shifting of said gate member between a valve open position, in which the valve inlet is in communication with said valve outlet, and a valve closed position, in which said gate member blocks communication between said valve inlet and said valve outlet,
said valve body further comprising a valve seat that said gate member contacts during shifting from said open position to said closed position in response to an energetic event downstream from said valve, said valve seat comprising an edge of a tubular member than extends into said passage,
said gate member comprising a bulged central section having opposed convex and concave surfaces and a circumscribing sidewall extending transversely from the concave surface, and a circumscribing rim extending transversely from said sidewall and outboard of said central section, said sidewall and said rim cooperating with said valve seat to block communication between said valve inlet and said valve outlet when said gate member is in said valve closed position, at least a portion of said central section extending past said valve seat edge and into said tubular member when said gate member is in said closed position.

10. The valve according to claim 9, wherein said valve further comprises a mechanism secured to said gate member operable to restrict movement of said gate member from said closed position.

11. The valve according to claim 10, wherein said mechanism is a hydraulic damping mechanism.

12. The valve according to claim 9, wherein said edge resides in a plane that is oblique to said passage through said valve body.

13. The valve according to claim 12, wherein when said gate member is in contact with said valve seat, at least a portion of said rim engages said edge.

14. The valve according to claim 13, wherein following contact with said valve seat, said gate member shifts in a direction toward said open position to a post-energetic event position in which at least a portion of said edge to become disengaged from said rim, when in said post-energetic event position said sidewall and said bulged central section cooperating with said tubular member to prevent upstream propagation of a flame front generated by the energetic event beyond said valve inlet.

15. The valve according to claim 9, wherein said valve further comprises one or more nozzles and installed within said valve body and configured to introduce a flow of gas into said passage adjacent said valve seat.

16. The valve according to claim 15, wherein said one or more nozzles are operable to deliver a pulsed flow of gas into said passage adjacent said valve seat.

17. A method of cleaning a passive isolation valve installed within an pneumatic material handling system comprising:
providing the valve according to claims 1;
connecting said one or more nozzles to a source of pressurized gas;
conducting a gaseous stream including suspended particulate material through said valve passage from said valve inlet to said valve outlet and around said gate member disposed in said open position; and
supplying a flow of said pressurized gas to said one or more nozzles so as to cause said pressurized gas to be ejected from said one or more nozzles and into said valve passage adjacent said valve seat, said flow of pressurized gas causing particulate material that has settled from said gaseous stream in an area adjacent said valve seat to become re-suspended within said gaseous stream and removed from said area adjacent said valve seat.

18. The method according to claim 17, wherein said pneumatic material handling system comprises a baghouse located downstream from said valve, said baghouse comprising a bag cleaning system, said bag cleaning system comprising a pressurized gas delivery system for delivering pulses of a pressurized gas to said bags and a controller operable to control the delivery of said pulses of a pressurized gas to said bags.

19. The method according to claim 18, wherein said flow of said pressurized gas to said one or more nozzles is controlled by said baghouse controller.

20. The method according to claim 18, wherein said source of pressurized gas connected to said nozzles is also a source of pressurized gas for delivering said pulses of pressurized gas to said bags.

21. The method according to claim 17, wherein said flow of pressurized gas to said one or more nozzles is provided as a pulsed flow of pressurized gas.

22. The method according to claim 21, wherein said valve includes a controller for controlling said pulsed flow of pressurized gas.

23. The method according to claim 22, wherein said controller is programmed to deliver pulses of said pressurized gas to said one or more nozzles at regularly repeating intervals.

24. The method according to claim 22, wherein said valve further includes one or more sensors operable to detect accumulation of said particulate material adjacent said valve seat and to provide a signal to said controller that causes said controller to deliver a pulse of pressurized gas to said one or more nozzles.

* * * * *